United States Patent
Miller et al.

(10) Patent No.: US 9,430,196 B2
(45) Date of Patent: Aug. 30, 2016

(54) MESSAGE INLINING

(71) Applicant: Cisco Technology, Inc., San Jose, CA (US)

(72) Inventors: Swaha Das Miller, Cary, NC (US); Jonathan Gregory Rossie, Jr., Holly Springs, NC (US); Jamie Taylor, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/515,916

(22) Filed: Oct. 16, 2014

(65) Prior Publication Data

US 2016/0110170 A1    Apr. 21, 2016

(51) Int. Cl.
*G06F 9/45* (2006.01)
*G06F 9/54* (2006.01)

(52) U.S. Cl.
CPC .............. *G06F 8/41* (2013.01); *G06F 9/546* (2013.01)

(58) Field of Classification Search
None
See application file for complete search history.

(56) References Cited

U.S. PATENT DOCUMENTS

| 5,644,709 | A |  | 7/1997 | Austin |
| 6,986,130 | B1 | * | 1/2006 | Boucher ................. G06F 8/447 717/150 |
| 7,124,405 | B1 |  | 10/2006 | Kakivaya et al. |
| 8,095,595 | B2 |  | 1/2012 | Bobbitt et al. |
| 2006/0023674 | A1 | * | 2/2006 | Goring ................ H04L 12/5693 370/338 |
| 2008/0229145 | A1 | * | 9/2008 | Bose ................... G06F 11/1407 714/10 |
| 2010/0179994 | A1 | * | 7/2010 | Bittles ................. G06Q 10/107 709/206 |
| 2011/0202907 | A1 | * | 8/2011 | Dice ................... G06F 9/45516 717/148 |
| 2013/0152090 | A1 |  | 6/2013 | Balko |

* cited by examiner

*Primary Examiner* — Daxin Wu
(74) *Attorney, Agent, or Firm* — Edell, Shapiro & Finnan, LLC

(57) ABSTRACT

In certain embodiments, source code that includes at least one request to send an asynchronous message between state machines is obtained at a computing system. The computing system determines whether the asynchronous message can be implemented as an inlined message. Executable machine code corresponding to the source code is compiled such that the asynchronous message is compiled as an inlined message.

17 Claims, 12 Drawing Sheets

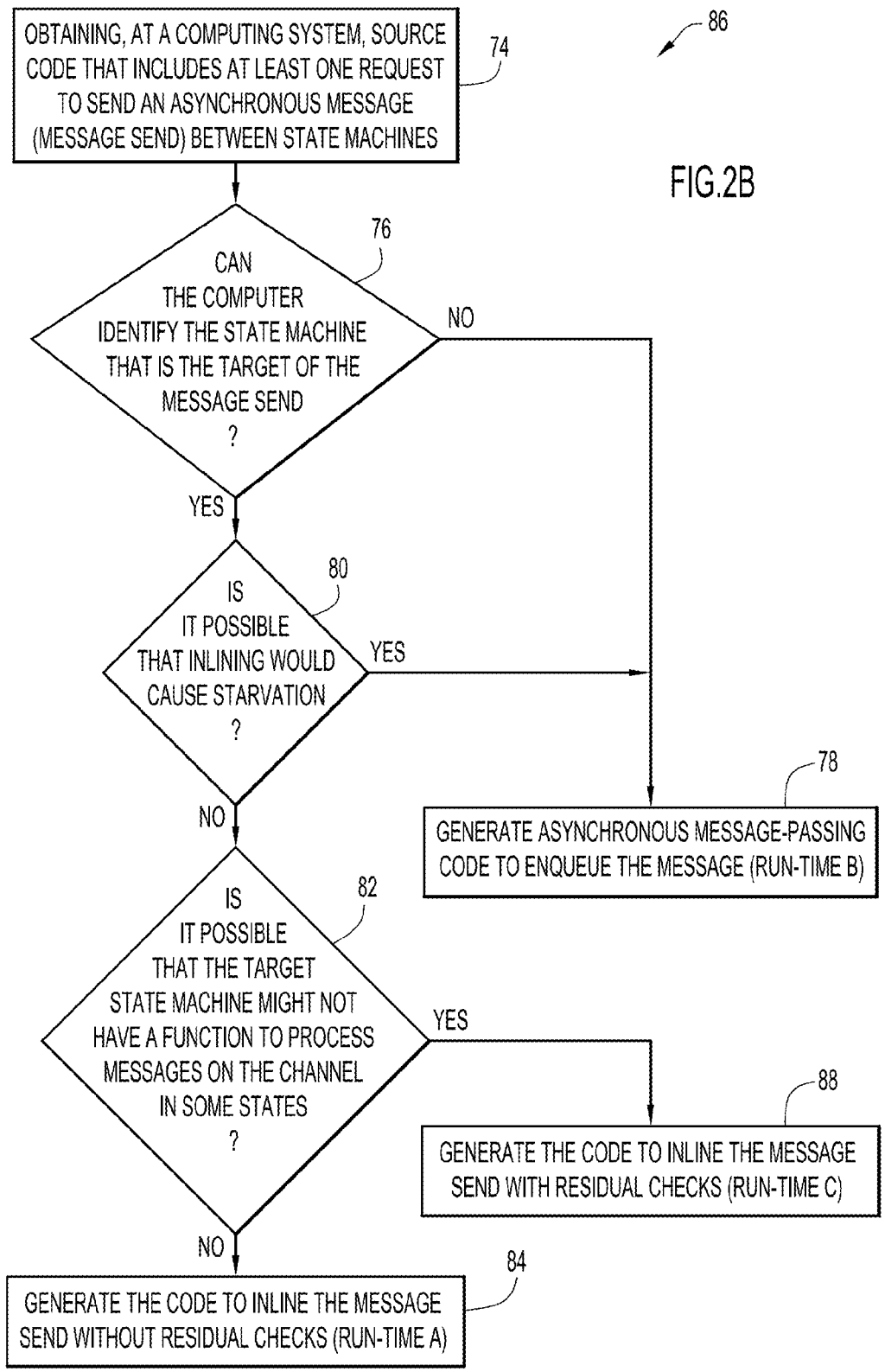

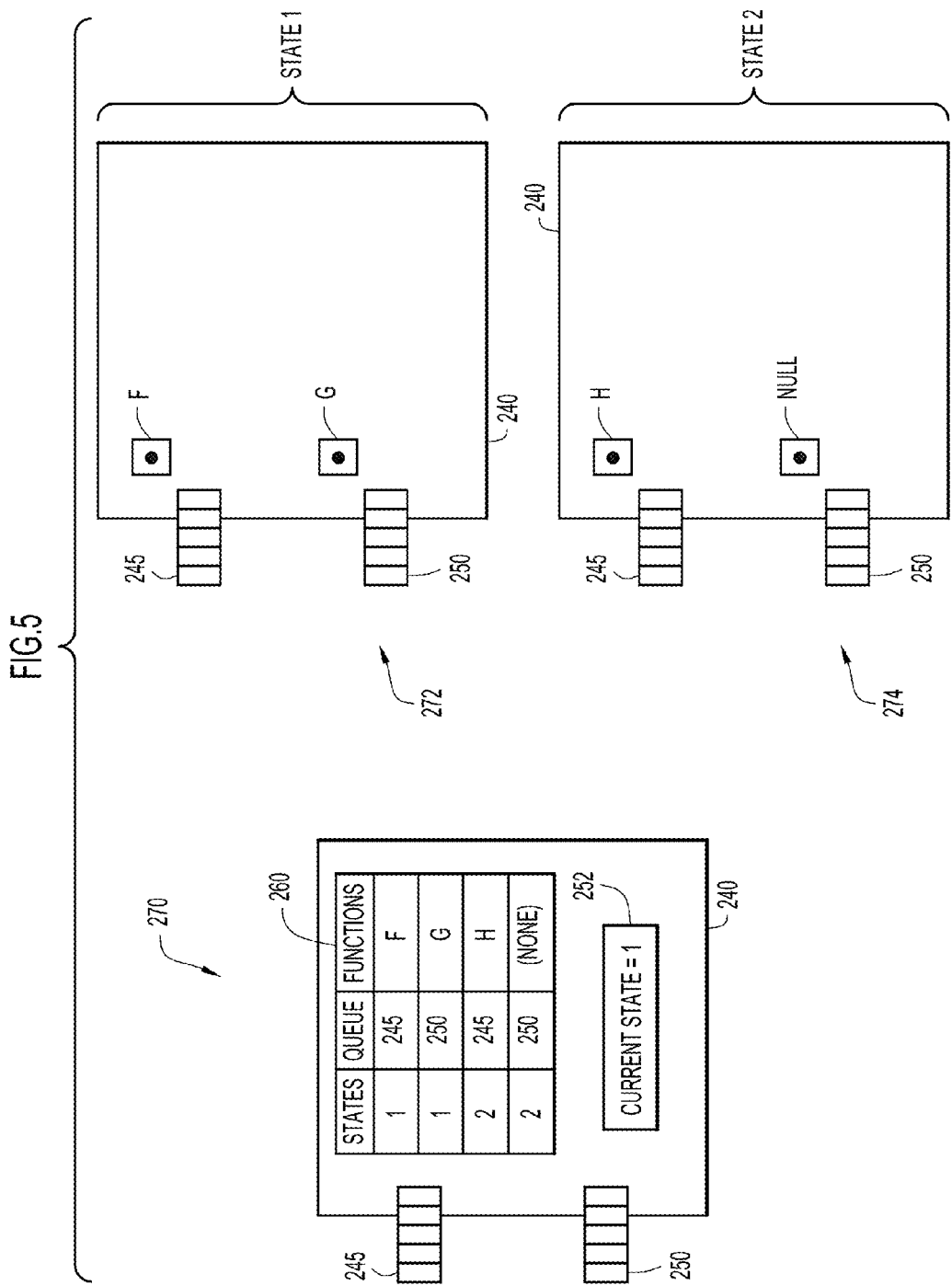

MESSAGE INLINING

TECHNICAL FIELD

The present disclosure generally relates to asynchronous messaging.

BACKGROUND

A computer or software program, or simply "program," is a sequence of instructions that may be executed by a computing device to perform various tasks/functions. In general, the program instructions are executed, for example, by one or more central processors, processors embedded directly into hardware, etc.

A program may have an executable form, sometimes referred to herein as executable machine code. The machine code includes instructions that are directly executed by the computing device. A program may also have a human-readable form, sometimes referred to herein as source code, from which the executable machine code is derived (e.g., compiled). The source code is written in a programming language designed to facilitate the ability of computer programmers to specify the actions to be performed by a computer device. A compiler is then used to convert the source files into the executable machine code.

BRIEF DESCRIPTION OF THE DRAWINGS

FIGS. 2A-2E are flowcharts illustrating further details of compile-time and run-time operations in accordance example embodiments.

FIG. 5 illustrates implementations of a state machine in accordance with aspects of the inlined messaging techniques.

DESCRIPTION OF EXAMPLE EMBODIMENTS

Overview

Figure 1:
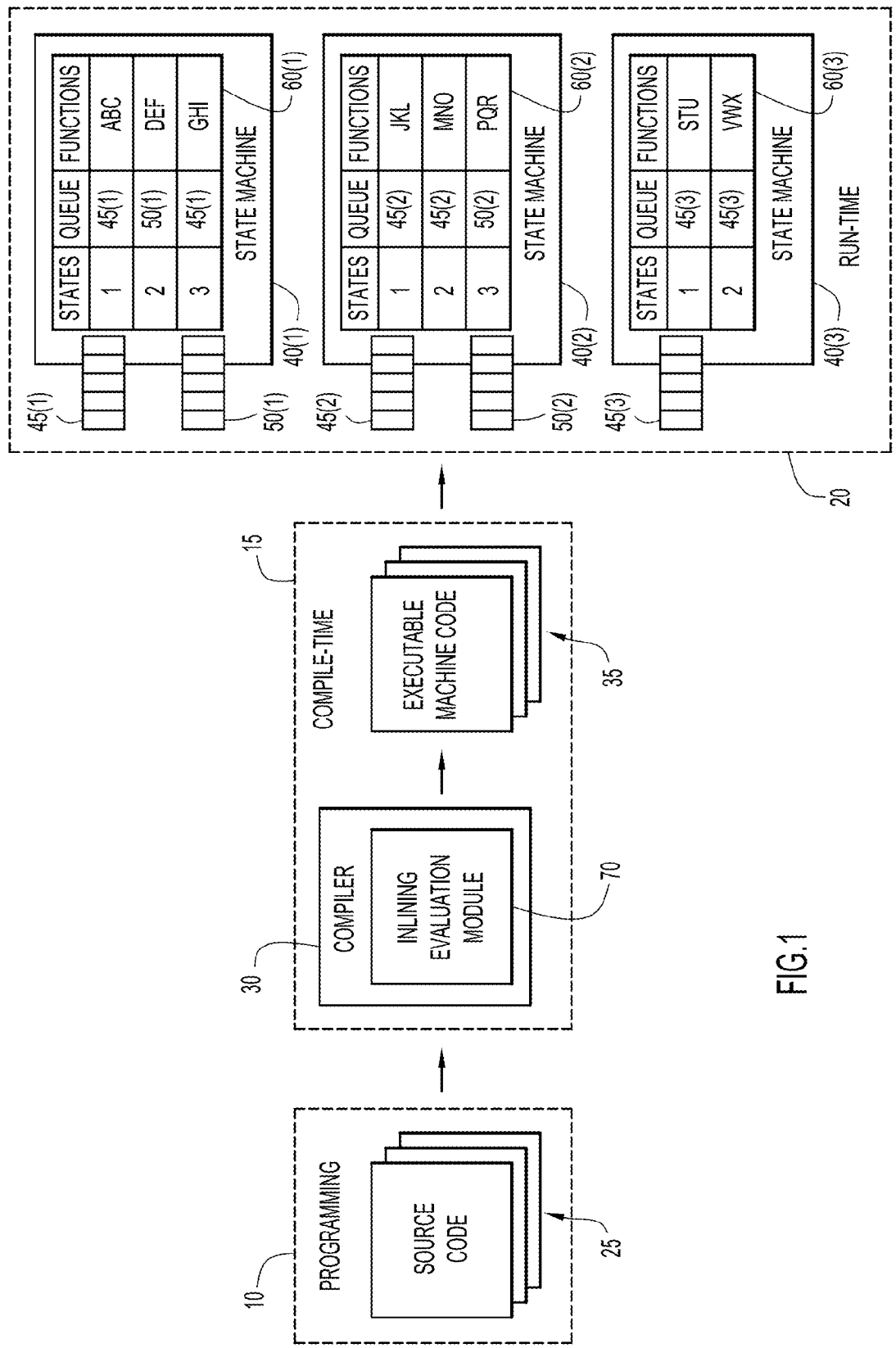
FIG. 1 is a schematic diagram illustrating inlined messaging techniques in accordance with example embodiments.

In certain embodiments, source code that includes at least one request to send an asynchronous message between state machines is obtained at a computing system. The computing system determines whether the asynchronous message can be implemented as an inlined message. Executable machine code corresponding to the source code is compiled such that the asynchronous message is compiled as an inlined message.

Example Embodiments

Development of computer/software programs (programs) may be generally divided into "programming," "compile-time," and "run-time." Programming refers to a stage in which a developer/programmer uses a programming language to create the source code for a computer program. That is, the developer first writes the source code defining how the program will function. Small programs may contain only a few hundred lines of source code, while large programs may contain hundreds of thousands of lines of source code. Lines of source code may be grouped into source files.

Compile-time refers to the stage in which the source code is "compiled" into executable machine code by a complier. In other words, compile-time includes a compilation process that generates an executable file. Run-time refers to the execution of a compiled executable file at a computing device.

In certain embodiments, the term "state machine" refers to a model of computation where the "machine" has a number of different states and only a single state can be active at any given time. As such, the state machine must transition from one state to another in order to perform different actions. State machines may be implemented in hardware or software in a variety of manners, including look-up tables, switch case blocks, etc. Therefore, the "state" of a state machine (i.e., the state of the associated/underlying digital logic circuit or program segment) may refer to the stored information, at a given instant in time, to which the circuit or code has access. The output of a state machine (i.e., the output of the associated/underlying digital circuit or program segment) at any time is determined by its current input(s) and its current state. In certain examples, state machines referred to herein may be substantially similar to a class/type of state machines referred to as "Mealy machines." Merely for ease of illustration, the description presented herein refers primarily to the use of state machines. Reference to a "state machine" herein may refer to the underlying digital circuit or program segment at which the corresponding state machine is instantiated.

The operation of certain programs may be expressed in terms of state machines. For example, network protocol programs may be expressed with a model of asynchronous messages passed between different state machines. Asynchronous messages or messaging generally refers to communications between two entities (e.g., applications, machines, systems, etc.) where the "sending" entity does not need to wait for a reply to continue processing. This is contrasted with synchronous messaging where the sending entity must wait for a reply before continuing processing. Providing high-level programming constructs for expressing asynchronous messaging allows programmers to develop systems easier, faster and in less error-prone manners. However, as described further below, asynchronous messaging is not amenable to automated inlining. As such, presented herein are techniques for automated compile-time inlining of asynchronous function calls in a manner that ensures the safety of the system and correct behavior.

More specifically, presented herein are inlined messaging techniques where a compiler automatically determines when the message send implementation can be changed from a standard queue-based implementation to an inlined implementation without introducing unwanted behaviors. By performing this analysis in a compiler (i.e., during compile-time), the need for residual checks, analysis, or decision making at run-time can be reduced or eliminated. As described further below, the compiler reduces the use of residual checks by ruling out any scenarios where an inlined message could lead to undesirable behavior.

FIG. 1 is a schematic diagram illustrating a life-cycle for a computer program, such as a networking protocol program, that makes use of the inlined messaging techniques presented herein. FIG. 1 illustrates a programming stage (programming) 10, a compile-time stage (compile-time) 15, and a run-time stage (run-time) 20. During programming 10, a developer/programmer generates/obtains source code 25 defined in a programming language. The source code 25 is provided to a compiler 30 where, during compile-time 15, the source code 25 is processed by the compiler to create/generate executable machine code 35. As described further below, the compiler 30 includes inlining evaluation logic 70 that may be executed to perform a set of compile-time evaluations to determine whether inlining of messages may be performed during run-time (i.e., whether to include inlined function calls within the executable machine code).

At run-time 20, the executable machine code 35 is loaded and executed to create multiple state machines in the run-time system. The run-time system may be a computing device, such as a computer, switch, router, server, or any other device configured to execute the executable machine code 35.

FIG. 1 illustrates a specific example in which three (3) state machines 40(1), 40(2), and 40(3) are instantiated in the run-time system. It is to be appreciated that the instantiation of three state machines is merely illustrative and the instantiation of other numbers of state machines is possible. The state machines 40(1), 40(2), and 40(3) include zero or more input queues. In the example of FIG. 1, state machine 40(1) includes a first input queue 45(1) and a second input queue 50(1), state machine 40(2) includes a first input queue 45(2) and a second input queue 50(2), and state machine 40(3) includes a single input queue 45(3).

The state machines 40(1), 40(2), and 40(3) each also comprise a plurality of states. For example, state machines 40(1) and 40(2) each have three possible states, while state machine 40(3) has two possible states. Since a state machine is always in one of the possible states, a state machine is referred to has having a "current" state. Additionally, the state machines 40(1), 40(2), and 40(3) each comprise a plurality of functions that are configured to be run/invoked upon receipt of a message. The function to be run is determined by the current state of the receiving state machine (i.e., the state machine that receives the message) and the input queue on which the message was received. FIG. 1 illustrates example internal state tables 60(1), 60(2), and 60(3) for state machines 40(1), 40(2), and 40(3), respectively. These internal state tables 60(1), 60(2), and 60(3) map a current state and queue to the function which should be invoked upon receiving a message at a specific queue. In this illustration, the states are schematically represented in the "state" column by numerals receiving queues are represented in the "queues" column using the illustrative reference numbers of FIG. 1, and the functions are schematically represented in the "function" column by text strings.

The state machines 40(1), 40(2), and 40(3) may communicate by passing asynchronous messages to one another. The passing of an asynchronous message may be referred to as occurring on asynchronous message "communication channel." It is to be appreciated that a communication channel between state machines does not refer to any type of underlying communication medium that is used to pass messages. Rather, in the context of standard queue-based asynchronous messaging, a communication channel refers to a mechanism by which a first state machine adds a message in the input queue of a second state machine. In the context of inline-based messaging, a communication channel refers to the direct invocation of a function (i.e., function call) by a state machine in the place of (i.e., rather than) adding a message in the input queue of a second state machine.

Standard queue-based asynchronous messaging is conventionally used for communications between two state machines. That is, a function requests that a message be sent from a first state machine to a queue processed by the second state machine (i.e., the asynchronous messages are passed via queueing). Referring specifically to communications between state machines 40(1) and 40(2), state machine 40(1) executes machine code that precedes a message-send request (i.e., function call to send a message). Once the state machine 40(1) encounters the message-send request, state machine 40(1) enqueues the message (e.g., a message M) onto an input queue (e.g., queue 45(2) of state machine 40(2)). State machine 40(1) then executes the code following the message-send send request. At some time later, state machine 40(2) services its queue and dequeues the message M. The state machine 40(2) determines which function will be executed depending on its current state. In this example, if state machine 40(2) is in the state schematically illustrated as "1," then the function for execution is "JKL" on the message M.

As is clear from the above, in accordance with standard queue-based asynchronous messaging, the message M is queued at the receiving state machine until the receiving state machine is in a state to process the message. There is both overhead and latency associated with queuing the message M and removing the message M from the queue, thereby increasing the computation cost and time associated with asynchronous messaging between the state machines. Additionally, message loss may occur, for example, when a queue becomes full. In accordance with the techniques presented herein, the compiler 30 may enable two state machines, such as state machines 40(1) and 40(2), to utilize "inlining" to eliminate the overhead, latency, unreliability, etc. associated with queuing of asynchronous messages.

In general, the inlining of messages is possible when a change from standard queue-based asynchronous messaging to inline-based messaging will not introduce unwanted behaviors into the system (e.g., will not cause run-time errors, etc.). In accordance with examples presented herein, unwanted behavior refers to behaviors that are both detectable and inconsistent with the semantics defined for asynchronous message passing. As such, the compiler 30, which converts the source code 25 into executable machine code 35, includes the inlining evaluation logic 70 that is configured to determine when inlining of asynchronous messages on a communication channel between state machines is possible (i.e., when the message send implementation between two state machines can be changed from the standard queue-based implementation to the inlined implementation without introducing unwanted behaviors). The inlining evaluation logic 70 may be executed to perform a set of compile-time evaluations/checks on every instance of an asynchronous message communication channel to determine whether inlining of messages on the channel would cause unwanted behavior on the channel. In certain embodiments, the inlined messaging techniques presented herein are generally transparent (i.e., not visible) to a user as the compiler decides whether to convert standard asynchronous queue-based messages into inlined messages. If it is determined that the inlining of messages on a communication channel will not cause unwanted behavior, then the compiler 30 inlines send invocations to the channel instances that have been identified as safe for inlining within the executable machine code 35.

As used herein, "inlining" may take several different forms. FIGS. 2A-2E are flowcharts illustrating exemplary compile-time and run-time operations in accordance with the techniques presented herein. More specifically, FIGS. 2A-2E show the range of options for what it means to implement inlined message passing in the compiler (FIGS. 2A and 2B) and the run-time (FIGS. 2C, 2D, and 2E). In certain embodiments, the operations shown in FIGS. 2A-2E may be performed for every request to send an asynchronous message between state machines. However, merely for ease of reference, the examples of FIGS. 2A-2E are described with reference to a single request to send an asynchronous message between state machines (i.e., a single asynchronous message send request).

Figure 2A:
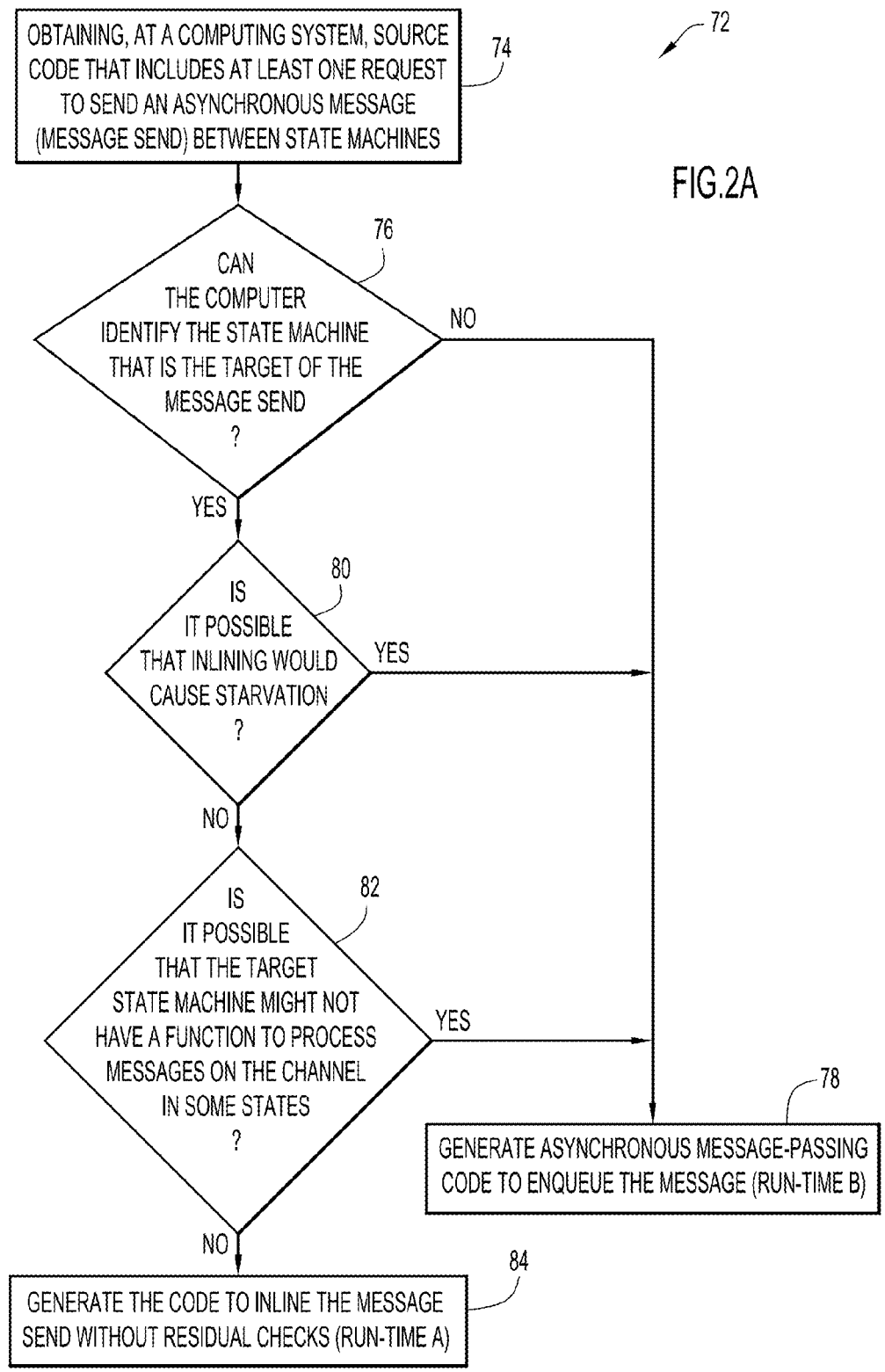
Figure 2C:
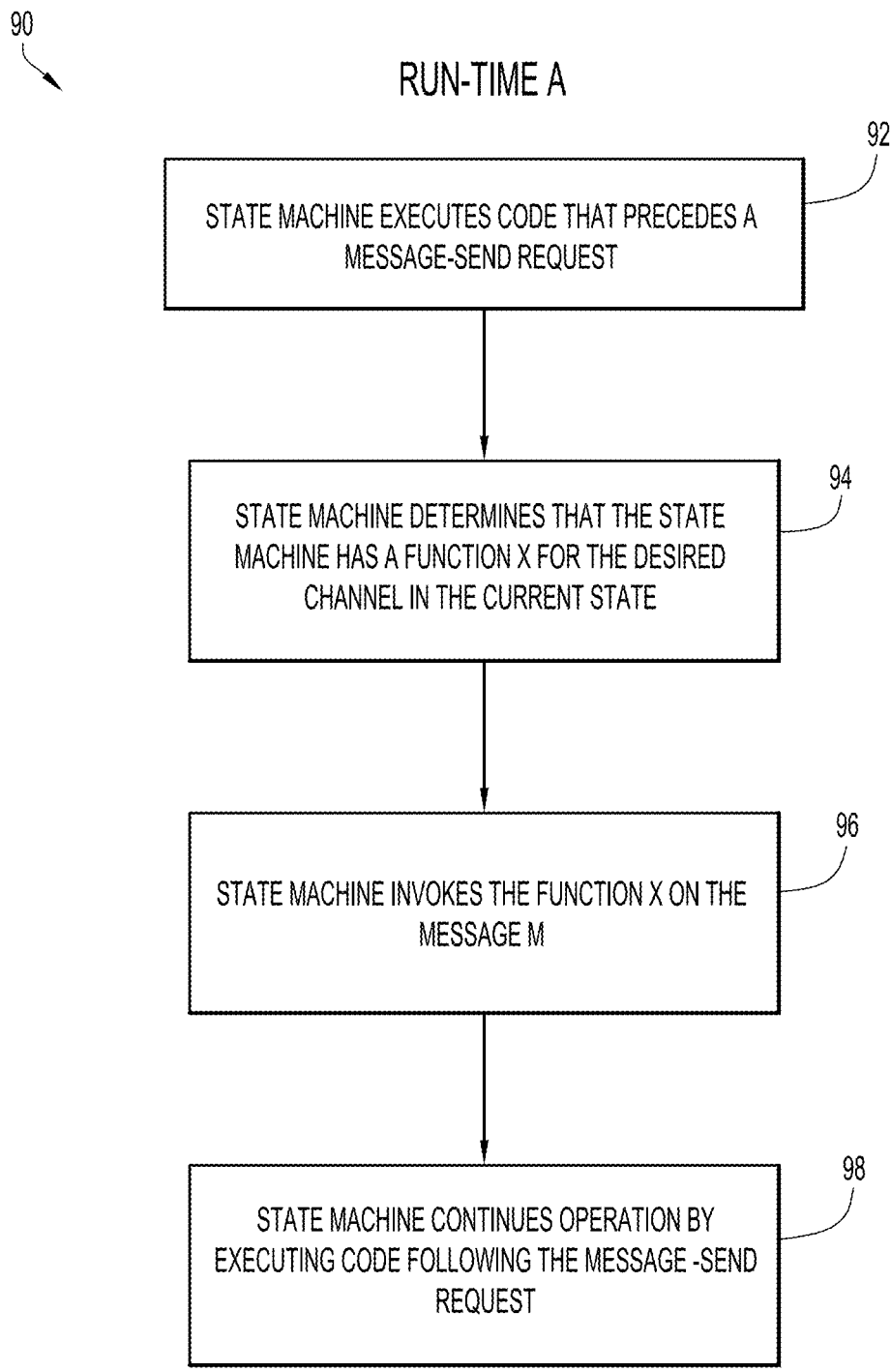
Figure 2D:
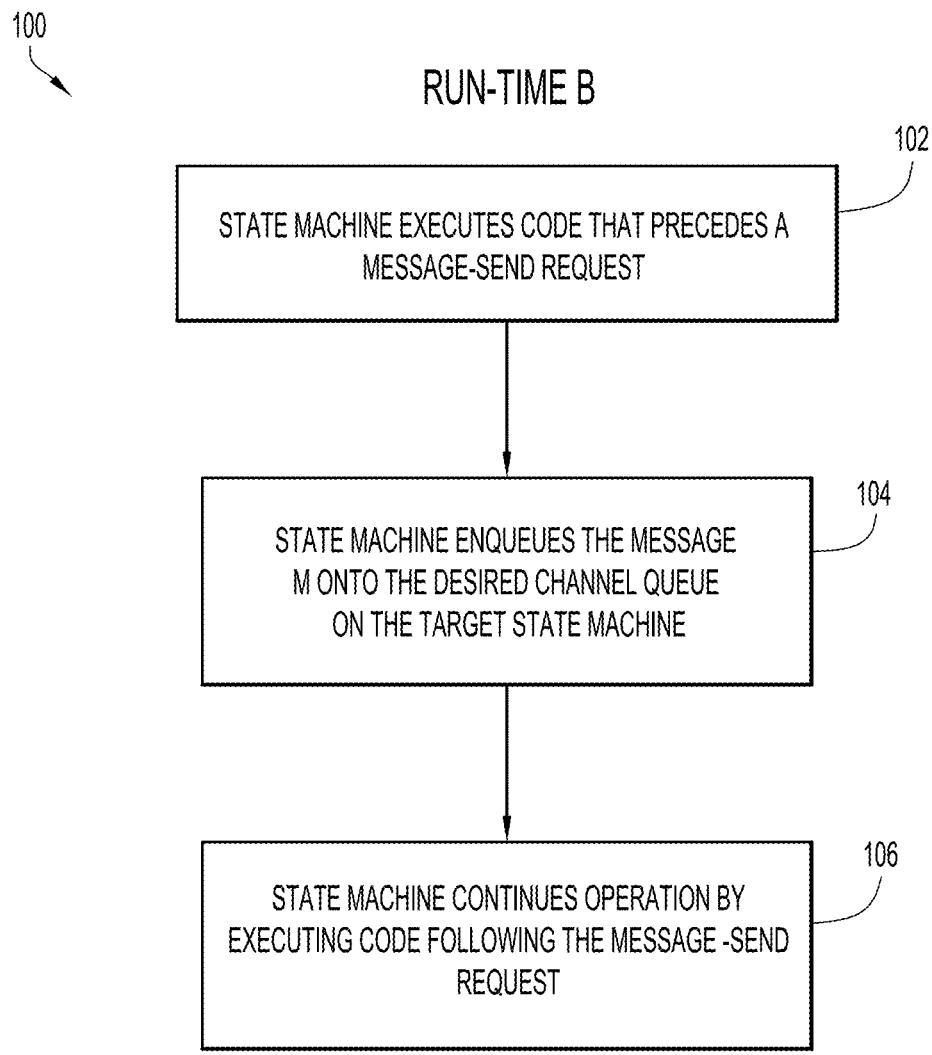
Figure 2E:
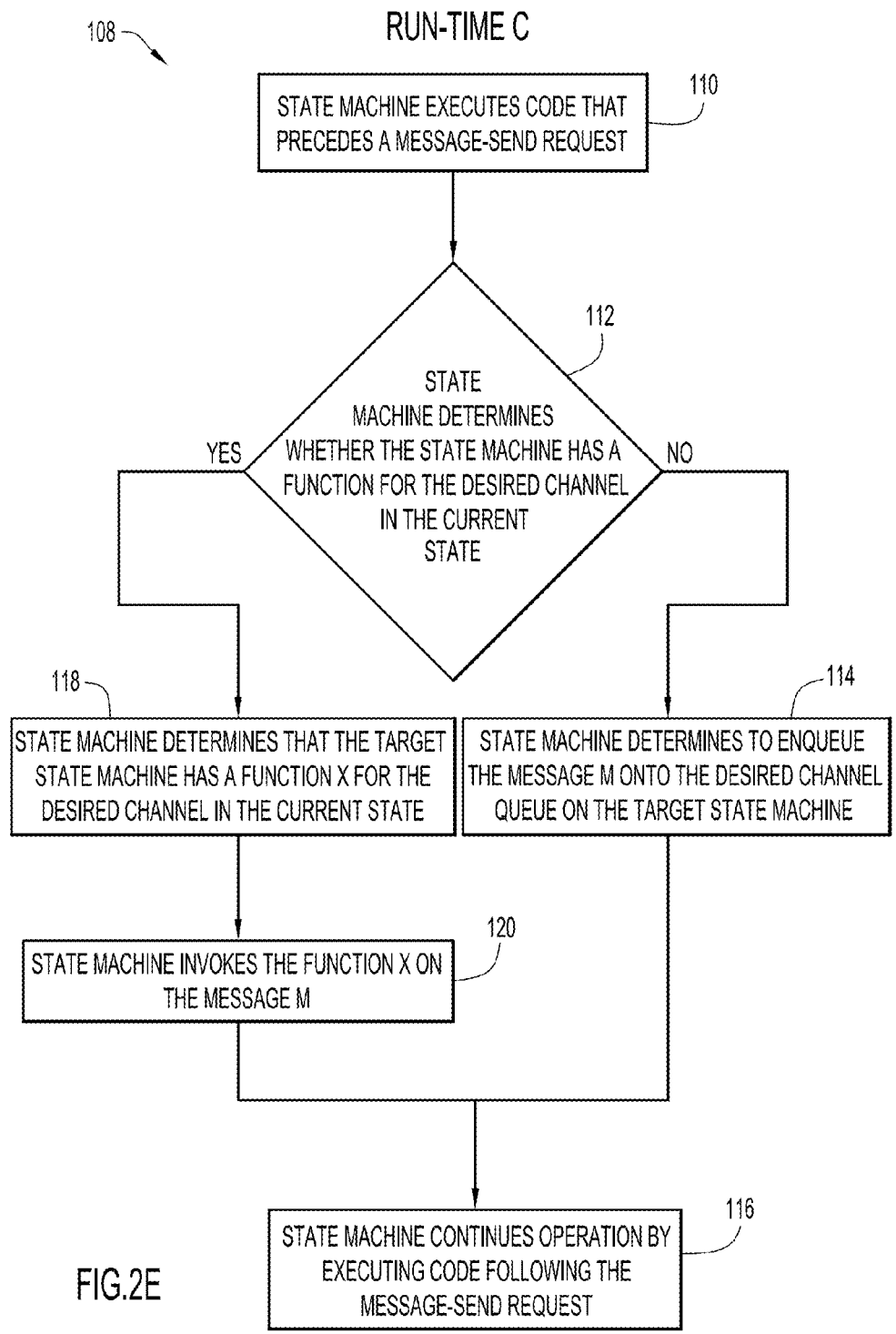

FIG. 2A is a flowchart illustrating a method 72 in which the compiler can make one of two implementation choices regarding how it should handle a request to send an asynchronous message between state machines. At 74, the compiler obtains source code that includes at least one request to send an asynchronous message between state machines (i.e., includes one asynchronous message send). At 76, a determination is made as to whether the compiler can identify the state machine that is the target of the asynchronous message. If not, method 72 proceeds to 78 where the compiler generates asynchronous message-passing code to enqueue the asynchronous message. The run-time behavior corresponding to asynchronous message-passing code that enqueues the asynchronous message is described further below with reference to FIG. 2D.

If at 76 the compiler can determine the state machine that is the target of the asynchronous message, then at 80 the compiler determines whether the inlining of the asynchronous message would cause starvation. If starvation could occur, then again method 72 proceeds to 78 where the compiler generates asynchronous message-passing code to enqueue the asynchronous message.

If at 80 the compiler determines that inlining of the asynchronous message could not cause starvation, then at 82 the compiler determines whether the target state machine may not have a function to process messages on the channel while in certain states. If this is the case, then again method 72 proceeds to 78 where the compiler generates asynchronous message-passing code to enqueue the asynchronous message.

If at 82 the compiler determines that the target state machine has a function to process messages on the channel while in all states, then method 72 proceeds to 84 where the compiler generates code to inline the asynchronous message without residual checks. The run-time behavior corresponding to code to inline the asynchronous message without residual checks is described further below with reference to FIG. 2C.

In summary, FIG. 2A illustrates a first implementation where the compiler chooses to generate code for the run-time behavior "A" shown in FIG. 2C when the compiler can guarantee the target state machine will always be able to process the message, and run-time behavior "B" shown in FIG. 2D otherwise.

FIG. 2B illustrates a method 86 corresponding to a second implementation in which the compiler can make one of three implementation choices regarding how it should handle a request to send an asynchronous message between state machines. Method 86 is similar to method 72 of FIG. 2A in that the method also includes operations 74, 76, 78, 80, 82, and 84. However, method 86 differs from method 72 in that the code generated in response to the determination at operation 82 is different. More specifically, as noted above, at 82 the compiler determines whether the target state machine may not have a function to process messages on the channel while in certain states. If this is the case, then method 86 proceeds to 88 where the compiler generates code to inline the asynchronous message with one or more residual checks. The run-time behavior corresponding to code to inline the asynchronous message with residual checks is described further below with reference to FIG. 2E.

If at 82 the compiler determines that the target state machine has a function to process messages on the channel while in all states, then method 86 proceeds to 84 where the compiler generates code to inline the asynchronous message without residual checks. As noted above, the run-time behavior corresponding to code to inline the asynchronous message without residual checks is described further below with reference to FIG. 2C In summary, FIG. 2B illustrates an implementation in which the compiler may choose to generate guarded inline code using one or more residual run-time checks. Run-time behavior "A" shown in FIG. 2C is initiated when the compiler can guarantee the target state machine will always be able to process the message.

As noted above, FIG. 2C illustrates a first run-time (run-time "A") method 90 in which a state machine is configured to inline an asynchronous message (message M) without residual checks. Method 90 begins at 92 where a first state machine (i.e., the sending state machine) executes code that precedes a message-send request. At 94, the first state machine determines that a second state machine (i.e., the target state machine) has a function X for the desired channel in the current state. At 96, the first state machine invokes the function X on the message M. At 98, the first state machine continues operation by executing code following the message-send request.

In summary, run-time "A" of FIG. 2C illustrates the behavior for unguarded inlined message sends with no residual run-time checks. As noted, this can arise during methods 72 or 86, depending on whether the compiler could guarantee that the target state machine will always be in a state where it can receive messages on the target channel.

Also as noted above, FIG. 2D illustrates a second run-time (run-time "B") method 100 in which a state machine is configured to enqueue an asynchronous message (message M). Method 100 begins at 102 where a first state machine (i.e., the sending state machine) executes code that precedes a message-send request. At 104, the first state machine enqueues the message M onto the queue of the second state machine (i.e., the target state machine). At 106, the first state machine continues operation by executing code following the message-send request.

In summary, run-time "B" of FIG. 2D illustrates the behavior for unguarded asynchronous message sends, with no inlining As noted, this can arise during methods 72 or 86, depending on whether the compiler could guarantee that the target state machine will always be in a state where it can receive messages on the target channel.

As noted, FIG. 2E illustrates a third run-time (run-time "C") method 108 in which a state machine is configured to inline an asynchronous message (message M) with one or more residual checks. Method 108 begins at 110 where a first state machine (i.e., the sending state machine) executes code that precedes a message-send request. At 112, the first state machine determines whether the second state machine (i.e., the target state machine) has a function for the desired channel in the current state. If the second state machine does not have a function for the desired channel in the current state, method 108 proceeds to 114 where the first state machine enqueues the message M onto the queue of the second state machine. The method 108 then proceeds to 116 where the first state machine continues operation by executing code following the message-send request.

Returning to 112, if the first state machine determines that the second state machine has a function for the desired channel in the current state, then method 108 proceeds to 118 where the first state machine determines that the second state machine has a function X for the desired channel in the current state. At 120, the first state machine invokes the function X on the message M. The method 108 then proceeds to 116 where, as noted, the first state machine continues operation by executing code following the message-send request.

As noted above, performing the inlining evaluation in the compiler 30 may reduce or substantially eliminate the use of residual checks, analysis, or decision making at run-time. In general, the compiler 30 performs the inlining evaluation by identifying any scenarios where the use of inlined messaging (inlined sends) would lead to undesirable behavior, as described below. The compiler 30 also identifies any messages where the target is not of a known state machine type and omits those messages from inlined messaging (i.e., it is not possible to do the analysis without information about the target state machine type). Three illustrative checks/evaluations that may be performed by the compiler 30 to guard against unwanted behaviors may include, for example: (1) detection of cycles introduced by the call graph of an inlined message which will lead to starvation; (2) detection of any violations of the transactional behavior of state machines with regard to mutable memory; and (3) determination of whether or not an input queue that is to receive a message will always have a function to invoke in the receiving state machine, regardless of its state. These three compile-time checks, which are merely illustrative, are described in greater detail below.

As noted, a first check may relate to the detection of cycles introduced by the call graph of an inlined message which will lead to starvation of other state machines. In one illustrative example shown in FIG. 3, a sequence of messages (message sends) forms a cycle that includes two (2) state machines, namely state machines 40(3) and 40(2) that communicate via a forward communication channel 135 and a reverse communication channel 130. In practice, cycles can contain an arbitrary number of state machines.

Figure 3:
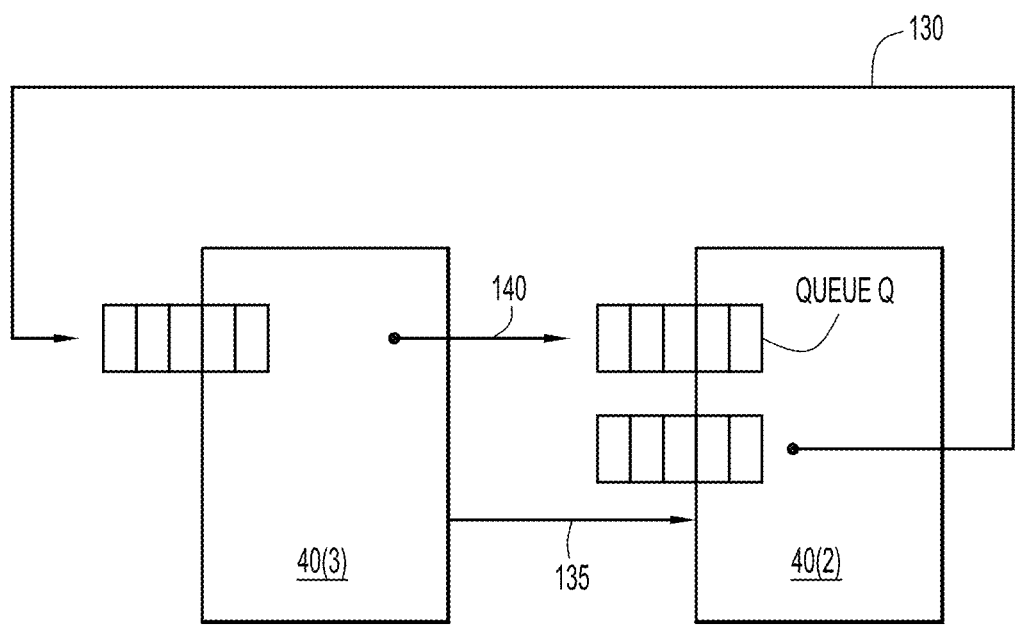
FIG. 3 is a schematic diagram illustrating a cycle that may be identified through use of the inlined messaging techniques.

The cycle of FIG. 3 is formed when a message 140, which is received on a queue (Q), results in a chain of message sends that includes another message to queue Q. If all of these message sends were to be inlined, then the resulting execution is unbounded and may be infinite. During the time that the unbounded computation is running (which may be until the system crashes if the execution is in fact infinite), resources are not available for one or more other state machines in the same run-time system. If another state machine is eligible to run (i.e., has pending messages in a queue and is in a state where it is able to process them), but is never scheduled by the system to run, that that other state machine is referred to as experiencing "starvation." Before enabling inlining of messages on a communication channel, the inlining evaluation logic 70 is configured to identify/detect when state machine starvation could occur as a result of inlined messages. If starvation could occur, then inlining of messages on the associated communication channel is not initiated. In other words, if starvation is determined to occur due to inlining on a communication channel, then the compiler 30 generates the machine code such that the communication channel utilizes a queue-based implementation.

Figure 4A:
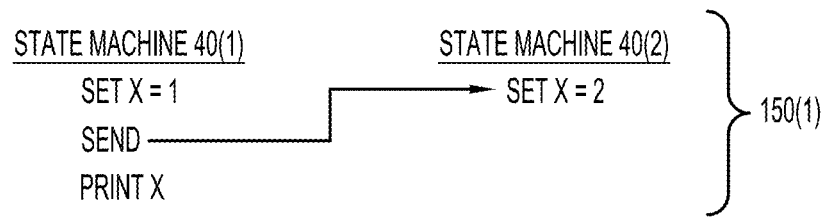
FIGS. 4A and 4B are schematic diagrams illustrating transactional behavior changes that may be identified through use of the inlined messaging techniques.
Figure 4B:
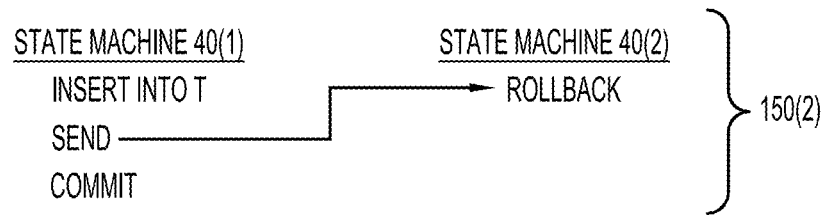

Reference is next made to the compile-time evaluation in which violations of the transactional behavior of state machines with regard to mutable memory are detected. FIGS. 4A and 4B illustrate two examples 150(1) and 150(2), respectively, in which a violation of transactional behavior could occur. In the first example 150(1), using standard queue-based messaging semantics, the evaluation of "set X=2" occurs after the evaluation of "print X," which will print "1." However, using inlined messaging semantics, the evaluation of "set X=2" occurs before the evaluation of "print X," which will print "2" (i.e., an error).

In the second example 150(2), using standard queue-based messaging semantics, the "insert into T" is committed and, later, the request to "ROLLBACK" occurs within a transaction local to state machine 40(2), thus causing roll back of only the local transaction. However, using inlined messaging semantics, the evaluation of "ROLLBACK" occurs prior to the evaluation of "commit," causing the transaction in state machine 40(1) to rollback, voiding the attempt to "insert into T."

In both of the examples 150(1) and 150(2), different behavior is observed depending on whether the message send is inlined or queued. In certain cases, the inlined behavior may be unwanted depending on the semantics of the message-passing system. As noted above, the inlining of messages is automatically executed by the compiler 30 and a change in the observed program semantics is improper. Therefore, the compiler 30 may examine the code to be executed as a result of the message send and determines whether it modifies shared mutable storage (e.g., updates a global variable or performs operations on a shared database). For example, if the target state machine for the message send can execute functions f, g, or h depending on its state, the compiler must examine the code of f, g, and h, and cannot inline the message send if any of them contain database operations. Therefore, before enabling inlining of messages on a communication channel, the inlining evaluation logic 70 is configured to detect whether a switch from queue-based messaging to inline messaging could result in behavior changes. If so, inlining of messages on the associated communication channel is not initiated. In other words, if an unwanted behavior change is determined to possibly occur due to inlining on a communication channel, then the compiler 30 generates the machine executable code such that the communication channel utilizes a queue-based messaging.

Reference is next made to the third compile-time evaluation in which it is determined whether or not an input queue that is to receive a message will always have a function to invoke, regardless of the state of the receiving state machine. This evaluation is described with reference to FIG. 5 which illustrates examples of a state machine 240 comprising input queues 245 and 250. More specifically, at reference 270, FIG. 5 illustrates a first implementation of the state machine 240 is a piece of mutable storage containing the current state 252 and a table 260 mapping the state number and input queue to the function to invoke when a message is processed from that queue in that state. References 272 and 274 of FIG. 5 illustrate a second implementation of the state machine 240 as a piece of mutable storage where, rather than including the table 260, each queue holds a mutable pointer to the function to invoke. The state machine 240 is illustrated in state "1" at reference 272 and in state "2" at reference 274. In either of the two implementations (i.e., 270 or 272/274), messages may be added to the queues but are only processed when in the correct state. For example, messages may be added to queue 250 in any state, but are processed only when the state machine 240 is in state 1.

In an implementation like the one shown at reference 270, an inlined send reads the current-state field in the target state machine and looks up the function to invoke in the table. In an implementation like that shown at 272 and 274, an inlined send does not need to directly examine the current state of the target (receiving) state machine, but rather can just invoke the function pointer stored with the target queue.

As noted above, in the third evaluation, the inlining evaluation logic 70 determines if the target queue of a message may, at run-time, have no function to invoke in the target state machine's current state (e.g., what to do when a send to queue 250 when the state machine is in state 2). As described above, one choice is to insert a run-time check on every inlined message send to see whether the function to invoke is NULL and fall back to the standard queue insertion in those cases. Also as described above, another choice is to add an analysis to the compiler that determines whether there is any state in the target state machine in which the function pointer would NULL. The compiler may then either choose not to inline the message send at all, or inline the send with the additional run-time check to see if the function pointer is NULL.

Figure 6:
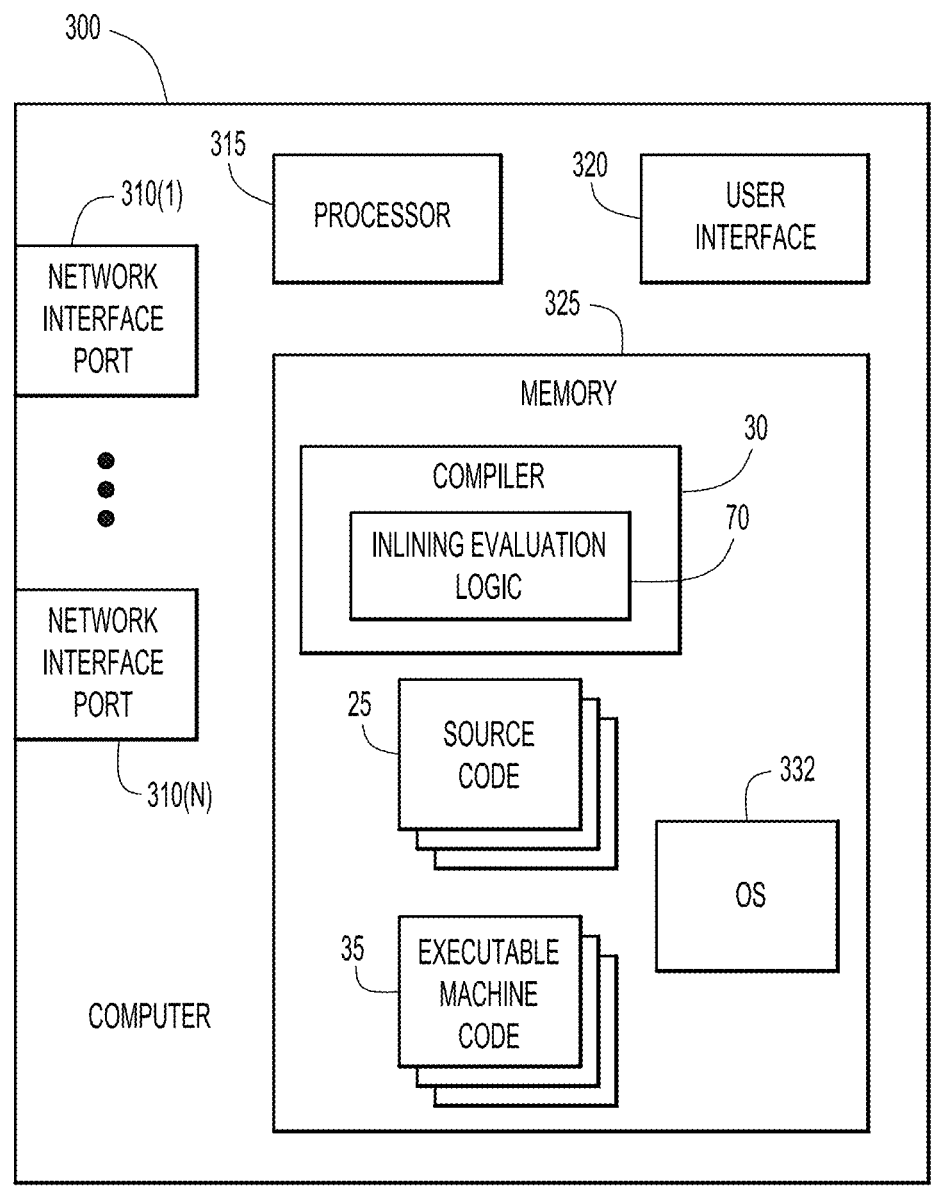
FIG. 6 is a block diagram of a compile-time system in accordance with example embodiments.
Figure 7:
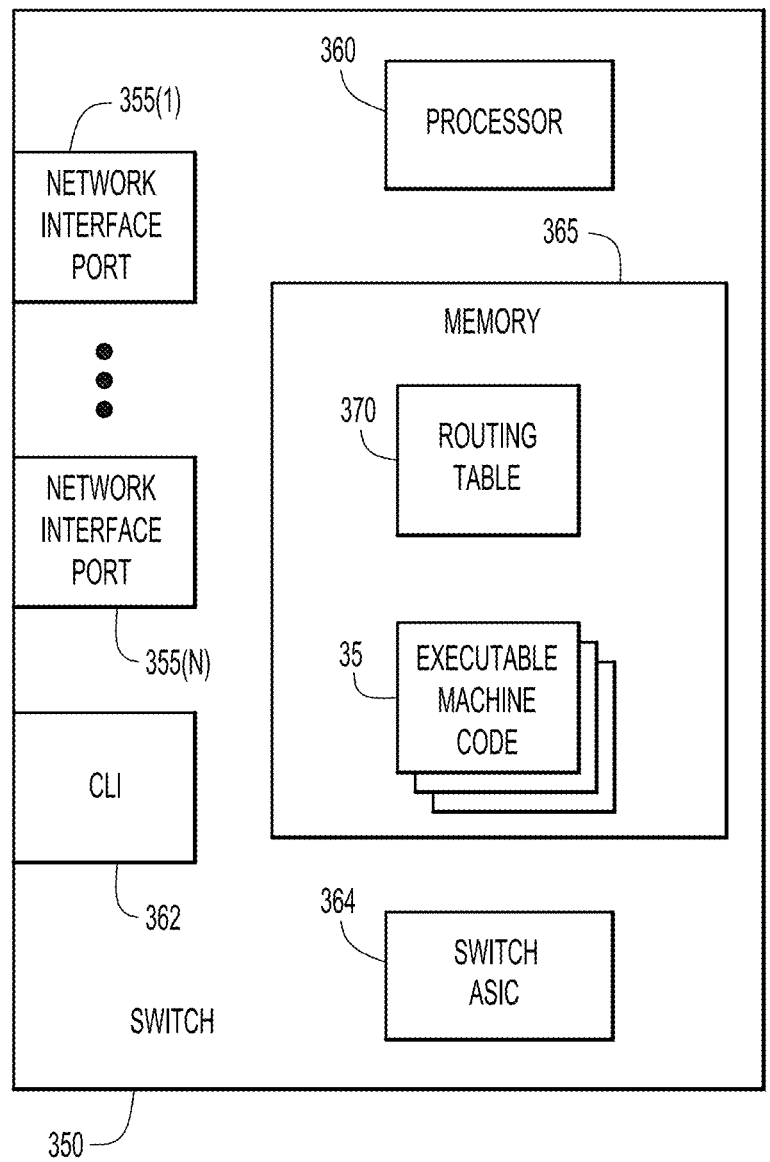
FIG. 7 is a block diagram of a run-time system in accordance with example embodiments.

FIG. 6 is a block diagram illustrating one example arrangement of a compile-time system in which the inlined messaging techniques may be executed. FIG. 7 illustrates a run-time system in which the inlined messaging techniques may be executed. It is to be appreciated that reference to inlined messaging techniques may refer to either or both of the compile-time and run-time inlining operations described herein.

Referring first to FIG. 6, the compile-time system is illustrated as a computer 300. The computer 300 may be, for example, a desktop computer, a laptop computer, or any other device having sufficient computation resources to compile source code 25 into executable machine code 35.

As shown, computer 300 comprises a plurality of network interface ports 310(1)-310(N). These network interface ports 310(1)-310(N) may be, for example, Ethernet ports of a network interface card (NIC) implemented in one or more application-specific integrated circuits (ASICs), wireless interfaces, etc. Computer 300 further comprises a processor 315 and a user interface 320. User interface 320 may take many different forms and may include, for example, a keypad, keyboard, mouse, touchscreen, display screen, etc.

Computer 300 also includes a memory 325 that comprises the source code 25, the executable machine code 35 generated through compilation of the source code 25, an operating system (OS) 332, and the compiler 30. As noted above, the compiler 30 includes the inlining evaluation logic 70. Memory 325 may comprise read only memory (ROM), random access memory (RAM), magnetic disk storage media devices, optical storage media devices, flash memory devices, electrical, optical, or other physical/tangible memory storage devices. The processor 315 is, for example, a microprocessor or microcontroller that executes instructions for the OS 332 and the compiler 30, including the inlining evaluation logic 70. Thus, in general, the memory 325 may comprise one or more tangible computer readable storage media (e.g., a memory device) encoded with software comprising computer executable instructions and when the software is executed (by the processor 315) it is operable to perform the operations described herein in connection with compiler 30 and the inlining evaluation logic 70.

Referring next to FIG. 7, the run-time system is illustrated as a switch 350. It is to be appreciated that the illustration of a switch is merely one example and, in practice, the run-time system may be a number of different computing devices configured to execute the executable machine code 35 (e.g., computer, router, server, etc.).

As shown, switch 350 comprises a plurality of hardware network interfaces (network interface ports) 355(1)-355(N), a processor 360, a command line interface (CLI) 362, a switch application specific integrated circuit (ASIC) 364, and a memory 365. The switch ASIC 364 is a hardware device that performs the various queuing, hashing and other networking switching operations. Memory 365 stores a routing table 370 and the executable machine code 35 received from the compile-time system (e.g., computer 300 of FIG. 6). Memory 365 may comprise ROM, RAM, magnetic disk storage media devices, optical storage media devices, flash memory devices, electrical, optical, or other physical/tangible (e.g., non-transitory) memory storage devices. The processor 360 is, for example, a microprocessor or microcontroller that executes the machine code 35. Thus, in general, the memory 365 may comprise one or more tangible computer readable storage media (e.g., a memory device) encoded with software comprising computer executable instructions and when the software is executed (by the processor 360) it is operable to perform the operations described herein for execution of the run-time inlining operations described herein.

Figure 8:
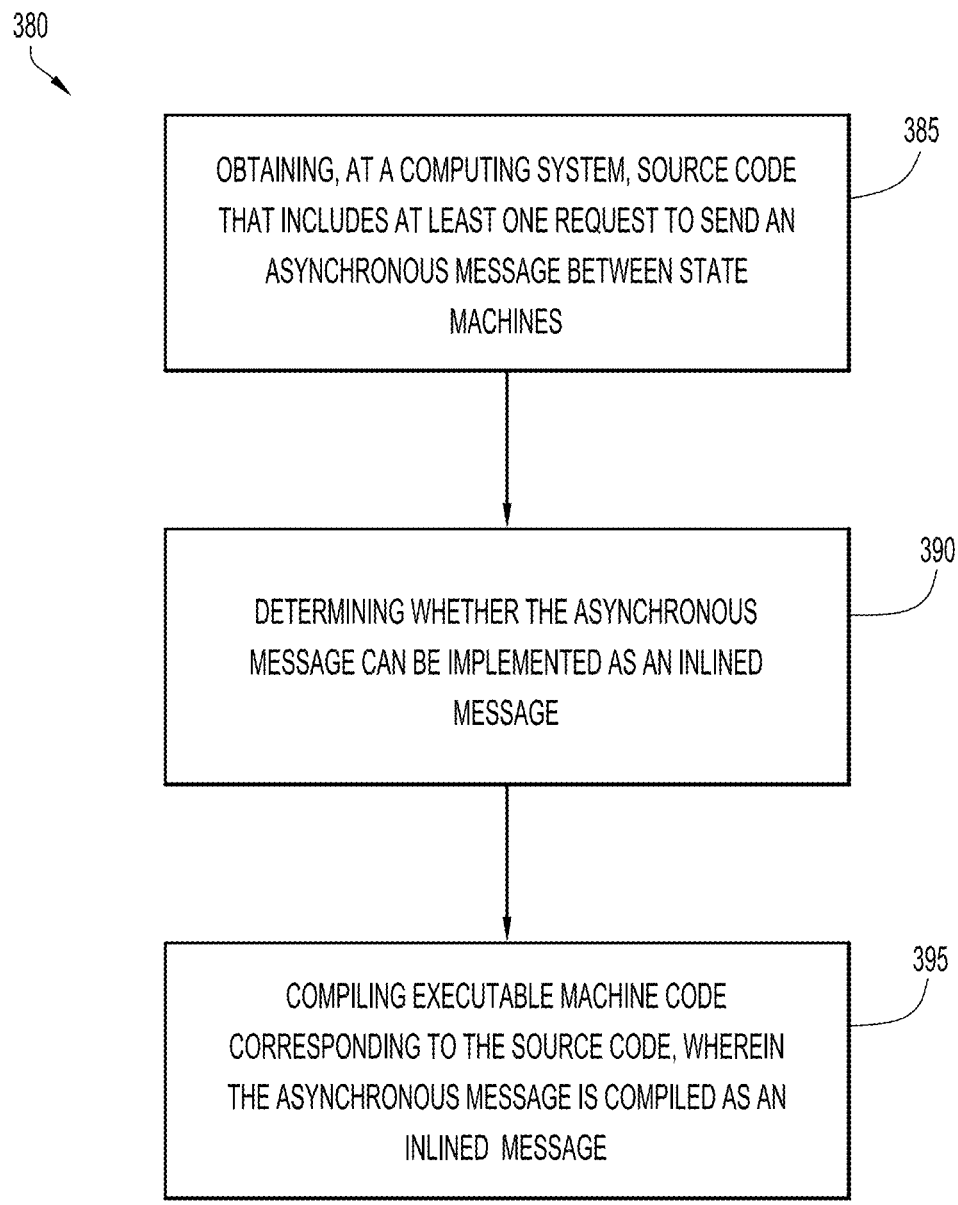
FIG. 8 is a flowchart of operations performed in accordance with the inlined messaging techniques.

FIG. 8 is flowchart of a method 380 in accordance with the inlined messaging techniques presented herein. Method 380 begins at 385 where source code that includes at least one request to send an asynchronous message between state machines is obtained at a computing system. The source code may be, for example, obtained from local or remote memory, entered by a user, etc. At 390, a determination is made as to whether or not the asynchronous message can be implemented as an inlined message. At 395, executable machine code corresponding to the source code is compiled to include the asynchronous message as an inlined message.

In summary, in one form, a method is provided comprising: obtaining, at a computing system, source code that includes at least one request to send an asynchronous message between state machines; determining whether the asynchronous message can be implemented as an inlined message; and compiling executable machine code corresponding to the source code, wherein the asynchronous message is compiled as an inlined message.

In another form, one or more computer readable storage media are provided encoded with software comprising computer executable instructions and when the software is executed operable to: obtain, at a computing system, source code that includes at least one request to send an asynchronous message between state machines; determine whether the asynchronous message can be implemented as an inlined message; and compile executable machine code corresponding to the source code, wherein the asynchronous message is compiled as an inlined message.

In another form, an apparatus is provided comprising: a network interface unit that enables communications over a network; a memory; and a processor coupled to the network interface unit and the memory, wherein the processor: obtains source code that includes at least one request to send an asynchronous message between state machines; determines whether the asynchronous message can be implemented as an inlined message; and compiles executable machine code corresponding to the source code, wherein the asynchronous message is compiled as an inlined message.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed:

1. A method comprising:
obtaining, at a computing system, source code that includes at least one request to send an asynchronous message between state machines;
determining whether the asynchronous message can be implemented as an inlined message, including determining whether a state machine that is a target of the asynchronous message can be identified; and
compiling executable machine code corresponding to the source code, wherein the asynchronous message is compiled as an inlined message.

2. The method of claim 1, further comprising:
when the state machine that is the target of the asynchronous message cannot be identified, generating asynchronous message-passing code to enqueue the asynchronous message.

3. A method comprising:
obtaining, at a computing system, source code that includes at least one request to send an asynchronous message between state machines;
determining whether the asynchronous message can be implemented as an inlined message, including determining whether state machine starvation could occur as a result of implementing the asynchronous message as an inlined message; and
compiling executable machine code corresponding to the source code, wherein the asynchronous message is compiled as an inlined message.

4. The method of claim 3, further comprising:
when it is determined that state machine starvation could occur as a result of implementing the asynchronous message as an inlined message, generating asynchronous message-passing code to enqueue the asynchronous message.

5. The method of claim 1, wherein determining whether the asynchronous message can be implemented as an inlined message comprises:
determining whether a receiving state machine will have a function to process messages received at an input queue, regardless of the state of the receiving state machine.

6. The method of claim 1, wherein compiling the executable machine code such that the asynchronous message is compiled as an inlined message comprises:
generating code to inline the asynchronous message without residual checks.

7. The method of claim 1, wherein compiling the executable machine code such that the asynchronous message is compiled as an inlined message comprises:
generating code to inline the asynchronous message with one or more residual checks.

8. One or more non-transitory computer readable storage media encoded with software comprising computer executable instructions and when the software is executed operable to:
obtain, at a computing system, source code that includes at least one request to send an asynchronous message between state machines;
determine whether the asynchronous message can be implemented as an inlined message, including determining whether a state machine that is a target of the asynchronous message can be identified; and
compile executable machine code corresponding to the source code, wherein the asynchronous message is compiled as an inlined message.

9. The non-transitory computer readable storage media of claim 8, further comprising instructions operable to:
when the state machine that is the target of the asynchronous message cannot be identified, generate asynchronous message-passing code to enqueue the asynchronous message.

10. The non-transitory computer readable storage media of claim 8, wherein the instructions operable to determine whether the asynchronous message can be implemented as an inlined message comprise instructions operable to:
determine whether state machine starvation could occur as a result of implementing the asynchronous message as an inlined message.

11. The non-transitory computer readable storage media of claim 10, further comprising instructions operable to:
when it is determined that state machine starvation could occur as a result of implementing the asynchronous message as an inlined message, generate asynchronous message-passing code to enqueue the asynchronous message.

12. An apparatus comprising:
a network interface unit that enables communications over a network;
a memory; and
a processor coupled to the network interface unit and the memory, wherein the processor:
obtains source code that includes at least one request to send an asynchronous message between state machines;
determines whether the asynchronous message can be implemented as an inlined message, including determining whether a state machine that is a target of the asynchronous message can be identified; and
compiles executable machine code corresponding to the source code, wherein the asynchronous message is compiled as an inlined message.

13. The apparatus of claim 12, wherein when the state machine that is the target of the asynchronous message cannot be identified, the processor:
generates asynchronous message-passing code to enqueue the asynchronous message.

14. The apparatus of claim 12, wherein to determine whether the asynchronous message can be implemented as an inlined message, the processor:
determines whether state machine starvation could occur as a result of implementing the asynchronous message as an inlined message.

15. The apparatus of claim 14, wherein when it is determined that state machine starvation could occur as a result of implementing the asynchronous message as an inlined message, the processor:
generates asynchronous message-passing code to enqueue the asynchronous message.

16. The apparatus of claim 12, wherein to determine whether the asynchronous message can be implemented as an inlined message, the processor:
determines whether a receiving state machine will have a function to process messages received at an input queue, regardless of the state of the receiving state machine.

17. The apparatus of claim 12, wherein to compile the executable machine code such that the asynchronous message is compiled as an inlined message, the processor:
    generates code to inline the asynchronous message without residual checks.

\* \* \* \* \*